(12) United States Patent  
Fischer

(10) Patent No.: US 8,141,847 B2
(45) Date of Patent: Mar. 27, 2012

(54) METHOD FOR CONTROLLING OR REGULATING A VACUUM VALVE

(75) Inventor: Richard Fischer, Rankwell (AT)

(73) Assignee: VAT Holding AG, Haag (CH)

( * ) Notice: Subject to any disclaimer, the term of this patent is extended or adjusted under 35 U.S.C. 154(b) by 126 days.

(21) Appl. No.: 12/688,140

(22) Filed: Jan. 15, 2010

(65) Prior Publication Data

US 2010/0116349 A1    May 13, 2010

Related U.S. Application Data

(63) Continuation of application No. PCT/AT2008/000264, filed on Jul. 21, 2008.

(30) Foreign Application Priority Data

Jul. 24, 2007  (DE) .......................... 10 2007 034 927

(51) Int. Cl.
*F16K 25/00*  (2006.01)
(52) U.S. Cl. .............................. 251/193; 251/326; 137/2
(58) Field of Classification Search .................. 251/157, 251/193, 326; 137/2
See application file for complete search history.

(56) References Cited

U.S. PATENT DOCUMENTS

| 4,052,036 | A | 10/1977 | Schertler |
| 4,470,576 | A | 9/1984 | Schertler |
| 4,634,094 | A | 1/1987 | Geiser |
| 4,809,950 | A | 3/1989 | Geiser |
| 4,921,213 | A | 5/1990 | Geiser |
| 6,073,655 | A | 6/2000 | Thompson et al. |
| 6,367,770 | B1 | 4/2002 | Duelli |
| 6,431,518 | B1 | 8/2002 | Geiser |
| 6,494,434 | B1 | 12/2002 | Geiser |
| 6,629,682 | B2 * | 10/2003 | Duelli ........................... 251/158 |
| 6,685,163 | B2 | 2/2004 | Blecha |
| 7,036,794 | B2 | 5/2006 | Duelli et al. |
| 2002/0088959 | A1 | 7/2002 | Duelli |
| 2004/0000659 | A1 | 1/2004 | Geiser |

FOREIGN PATENT DOCUMENTS

DE    4023845    4/1992
JP    2007146908    6/2007

* cited by examiner

*Primary Examiner* — John Fristoe, Jr.
(74) *Attorney, Agent, or Firm* — Volpe and Koenig, P.C.

(57) ABSTRACT

A method for controlling or regulating a vacuum valve that includes a valve body (1) with a valve opening (2), a closing member (3), an actuator (5) for moving the closing member (3), and a control device (9) by which the actuator (5) is triggered and by which the pressing force acting on the elastic seal (4) in the closed position of the closing member (3) is set. The setting of the pressing force acting on the elastic seal (4) is performed as a function of at least one parameter that can be input by a user.

5 Claims, 5 Drawing Sheets

METHOD FOR CONTROLLING OR REGULATING A VACUUM VALVE

CROSS-REFERENCE TO RELATED APPLICATIONS

This application is a continuation of PCT/AT2008/000264, filed Jul. 21, 2008, which claims the benefit of German Patent Application No. 10 2007 034 927.2, filed Jul. 24, 2007, both of which are incorporated herein by reference as if fully set forth.

BACKGROUND OF THE INVENTION

The invention relates to a method for controlling or regulating a vacuum valve that comprises:
 a valve body with a valve opening,
 a closing member that can be moved between an open position and a closed position for closing the vacuum valve and that closes the valve opening in the closed position, wherein at least one elastic seal is pressed with a pressing force onto a seal face,
 an actuator for moving the closing member, and
 a control device by means of which the actuator is controlled and by which the pressing force acting on the elastic seal in the closed position of the closing member is set.

Control devices for vacuum valves are known, wherein these control devices control an actuator for opening and closing the closing member and wherein, for activating the actuator, a corresponding operating means, usually compressed air, is fed to this actuator. Here, self-opening and self-closing valves are known in which, in the case of loss of operating means, the open position or closed position of the closing member is maintained by spring elements. In addition to pneumatically driven vacuum valves, electrically driven vacuum valves are also known. It is also known to feed various input signals on the valve state to the control device, in order to realize safety functions, i.e., to prevent or to trigger the opening or closing of the vacuum valve for certain states of the vacuum system.

From U.S. Pat. No. 7,036,794 B2, a method for controlling a vacuum valve is known in which the pressing force acting on the elastic seal is set by the control device as a function of a determined value for the differential pressure between the two vacuum chambers between which the vacuum valve is arranged. In this way, the wear of the elastic seal can be reduced.

SUMMARY

The invention provides expanded possibilities for controlling or regulating a vacuum valve of the type noted above.

This is achieved according to the invention by a method for controlling or regulating a vacuum valve that comprises:
 a valve body with a valve opening,
 a closing member that can be moved between an open position and a closed position for closing the vacuum valve and that closes the valve opening in the closed position, wherein at least one elastic seal is pressed with a pressing force onto a seal face,
 an actuator for moving the closing member, and
 a control device by which the actuator is controlled and by which the pressing force acting on the elastic seal in the closed position of the closing member is set,
 wherein the setting of the pressing force acting on the elastic seal is realized as a function of at least one parameter that can be input by a user.

The invention here starts from the basic idea that advantages can be achieved if the pressing force acting on the elastic seal is realized as a function of at least one input option provided by the user. For example, a parameter selected by a user input can mirror at least two possible configurations of the vacuum valve. Thus, this selectable configuration can be, for example, the construction of the elastic seal with respect to the material from which it is made or its geometry. Therefore, in the case of different constructions of the seals being used, the pressing force that acts on the seal and that is optimized for a required gas tightness and simultaneously for the smallest possible pressure on the seal in order to protect the seal.

Instead of or in addition to an input option for a configuration of the vacuum valve, it could also be provided to provide an input option for the user through which this user can select from at least two possible operating modes, wherein the setting of the pressing force acting on the elastic seal is performed as a function of the selected operating mode. Thus, for example, at least one "process mode" and one "service mode" could be provided, wherein, in the service mode, a higher pressing force is exerted on the elastic seal than in the process mode. Therefore, in the service mode, a secure seal with a low leakage rate can be achieved, while in the process mode, the seal is protected.

Instead of a manual input of at least one parameter that represents one of at least two possible configurations of the vacuum valve or one of at least two possible operating modes of the vacuum valve, it is also conceivable and possible that one such parameter is automatically detected by the control device. The setting of the pressing force acting on the elastic seal as a function of at least one such parameter—independent of whether this is input manually or detected automatically—thus represents an aspect of the invention to be considered as independent.

In the scope of this specification, when the discussion is of a "control device," this term comprises all devices, in particular, electronic devices, by which control processes can be performed in the sense of open control or regulation methods comprising at least one control loop or combinations of these.

In one embodiment of the invention, the actuator can permit a control or regulation of force, i.e., the closing force exerted by it can be set by the control unit, wherein the pressing force acting on the seal in the closed state of the vacuum valve is controlled or regulated by the setting of the closing force of the actuator.

As a function of the type of vacuum valve that is used, either the pressing force acting on the elastic seal can come from just the closing force exerted by the actuator or the pressing force is produced from the superimposition of the closing force exerted by the actuator with a force caused by the differential pressure between the two vacuum chambers.

In another embodiment of the invention, the actuator contacting the seal face can permit a control or regulation of the location or position, i.e., the closing position of the closing member can be set by the control unit, wherein the pressing force acting on the seal in the closed state of the vacuum valve is controlled or regulated by setting the closing position of the closing member.

The method according to the invention can be used in connection with very different types of valves. For example, the valve could be constructed in a way in which the entire closing movement between the open position and the closed position of the closing member takes place in a straight line for all parts of the closing member. Such vacuum valves are known, for example, from U.S. Pat. No. 4,809,950, U.S. Pat. No. 6,685,163 or U.S. Pat. No. 4,921,213.

The method can also be used, for example, in valves that are constructed like slide valves, as known, for example, from U.S. Pat. No. 4,052,036 or U.S. Pat. No. 4,470,576.

A construction of the vacuum valve like a butterfly valve, for example, is also conceivable and possible. Such butterfly valves are known, for example, from U.S. Pat. No. 4,634,094 or U.S. Pat. No. 6,494,434.

Furthermore, a construction of the vacuum valve, for example, as an L-valve is also conceivable and possible. Such an L-valve is known, for example, from U.S. Pat. No. 6,431,518. The individual moving components of the L-movement can here be caused by the same actuator or by different actuators.

Furthermore, a construction of the vacuum valve in which the closing member has a V-shaped construction is also possible, for example, and has seals on both sides that contact corresponding congruent seal faces, as emerges from U.S. Pat. No. 6,367,770.

BRIEF DESCRIPTION OF THE DRAWINGS

Additional advantages and details of the invention will be explained below with reference to the accompanying drawing. Shown in the drawings are.

DETAILED DESCRIPTION OF THE PREFERRED EMBODIMENTS

Figure 1:
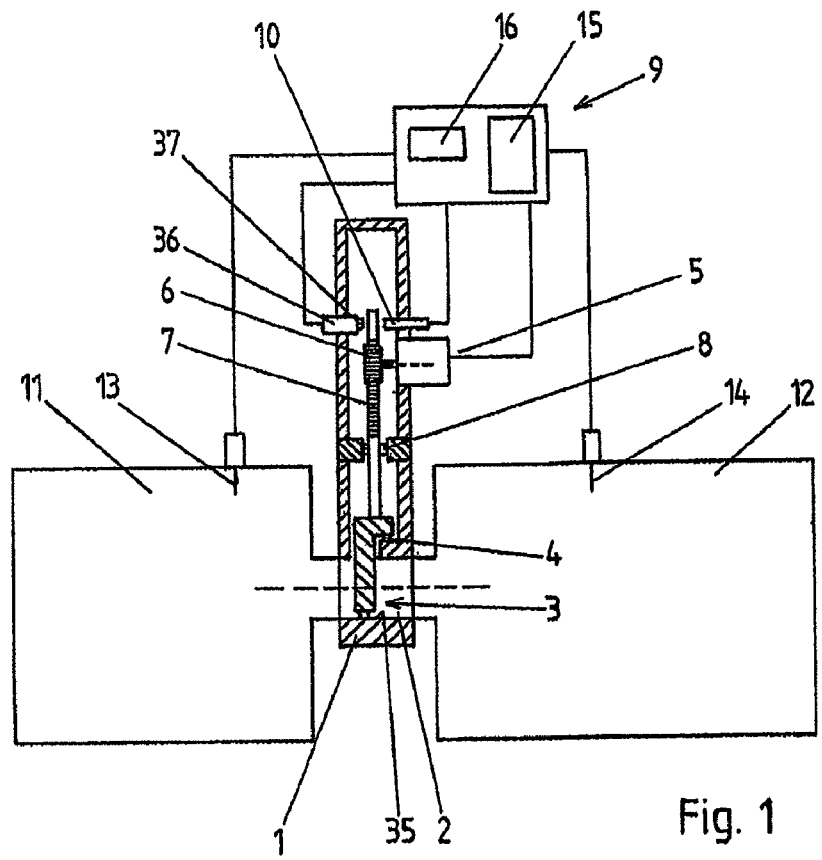
FIG. 1 is a schematic diagram of a vacuum valve arranged between two vacuum chambers, the vacuum valve shown schematically in cross section along the axis of the valve opening in the closed position of the closing member.
Figure 2:
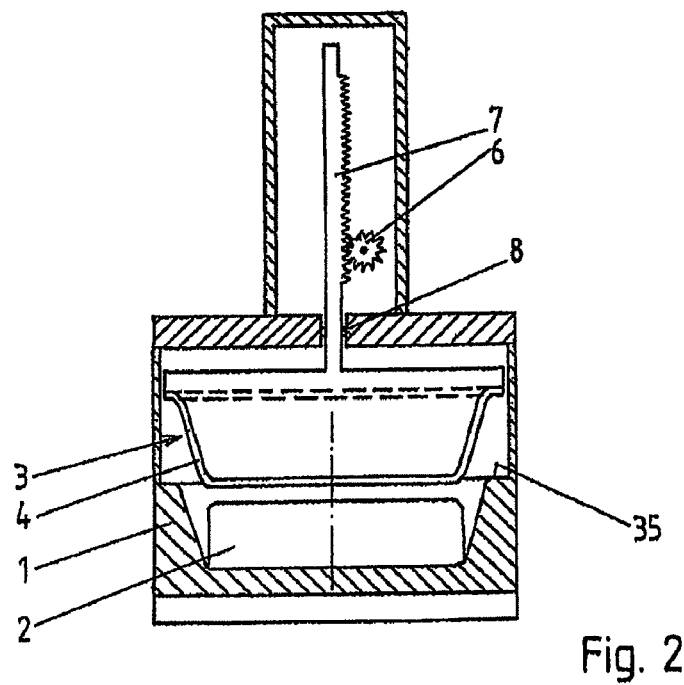
FIG. 2 is a schematic section of the vacuum valve from FIG. 1 in the direction perpendicular to the axis of the valve opening in the open position of the closing member.

One example for a vacuum valve in which the method according to the invention can be executed is shown schematically in FIGS. 1 and 2. The vacuum valve comprises a valve body 1 with a valve opening 2 constructed in the form of a passage channel and a closing member 3. The closing member 3 opens the valve opening 2 in an open position (FIG. 2) and closes the valve opening 2 in a closed position (FIG. 1). In the closed position of the closing member 3, an elastic seal 4 is pressed onto a seal face 35. The seal 4 is here arranged on the closing member 3 and the seal face 35 on the valve body 1. A reversed arrangement is likewise possible.

In this embodiment of the vacuum valve, the seal 4 has sections that lie in two parallel planes set apart from each other in the direction of the longitudinal axis of the valve opening 2 and that are connected to each other by connecting sections. Such a construction of a closing member 3 and the seal face 35 of the valve body 1 is known and described, for example, in U.S. Pat. No. 4,809,950.

An actuator 5 that is constructed in this embodiment in the form of an electric motor, for example, an AC servomotor, DC servomotor, or a stepper motor, is used for moving the closing member 3 from its open position shown in FIG. 2 into its closed position shown in FIG. 1. The adjustment of the closing member 3 by the actuator 5 is realized via gear elements set in-between, in the shown embodiment, a pinion 6 and a toothed rack 7 are shown schematically. The closing member 3 is mounted on an extension of the toothed rack 7. This extension of the toothed rack 7 forming a valve rack is sealed in this way (seal 8) and introduced movably into the vacuum region of the vacuum valve.

The actuator 5 is triggered by a control device 9, wherein the movement of the actuator 5 is controlled by the control device 9. The control device 9 has an input device 15, for example, a keyboard, for the input of data, for example, parameters or input variables for the control or regulation. Furthermore, the control device 9 has an output device 16, for example, a display or a screen. An acoustic output could also be provided.

Several actuators 5 triggered by the control device 9 could also be provided.

In the illustrated embodiment, the position of the closing member 3 is detected by a sensor 10, for example, through the detection of coding arranged on the toothed rack 7. The detected position of the closing member 3 is fed to the control device 9 for constructing a control loop. In this embodiment, the movement of the closing member 3 is regulated, as is preferred.

Furthermore, a brake or holding device 36 is provided by which the closing member 3 can be fixed at least in the closed position, advantageously also in other positions, for example, in the open position or at any position of its closing path. The holding device 36 that is shown only schematically in FIG. 1 and that is activated by the control device 9 can have a self-closing construction in a favorable way, i.e., when an operating means, e.g., current or compressed air, is supplied, it is opened and without the supply of operating means, it closes. For example, a spring device could be provided here that presses a friction element 37 onto a part, e.g., the toothed rack 7, connected to the closing member 3.

For example, electromechanical, electromagnetic holding devices 36 or pneumatic holding devices 36 could be used.

The vacuum valve is arranged between vacuum chambers 11, 12 and thus communication between the vacuum chambers 11, 12 or a gas-tight closure between the vacuum chambers 11, 12 is possible via the vacuum valve. For example, a process could be performed in one of the vacuum chambers 11 on at least one work piece to be processed, for example, a wafer. The other vacuum chamber 12 could be, for example, a transfer chamber.

Advantageously, pressure sensors 13, 14 also shown schematically in FIG. 1 are provided by which the prevailing pressure in each vacuum chamber 11, 12 can be detected. The pressure measurement values are fed to the control device 9.

In order to achieve a vacuum-tight closure of the valve opening 2 of the vacuum valve in the closed position of the closing member 3, a closing force is exerted by the actuator 5 on the closing member 3 with which this member is pressed in the closed position against the valve seat provided on the valve body 1, wherein the elastic seal 8 is pressed onto the seal face 35. The pressing force acting on the seal 4 with which it is pressed onto the seal face 35 is caused in this embodiment of the invention essentially only by the closing force exerted by the actuator 5 (and not by a differential pressure possibly existing between the valve chambers 11, 12). The pressing force with which the seal 4 is pressed onto the seal face 35 could also be designated as a "sealing force."

Different inputs can be performed by the user by the input device 15. At least one of these inputs specifies a parameter of the control device 9 that influences the sealing force that is set by the control device 9 and that acts on the seal 4. The user inputs influencing the sealing force can here comprise the following inputs individually or in an arbitrary combination:

A selection between at least two operating modes provided by the control device 9 can be made by the user through an input into the input device 15. One of these operating modes is here a service mode for performing a service in a vacuum region that is closed by the vacuum valve in the closed position of the closing member 3. In particular, this vacuum region is formed by the interior of one of the two vacuum chambers 11, 12 between which the vacuum valve is arranged. In the service mode, a relatively high pressing force is exerted on the elastic seal 4, in order to achieve a secure sealing with a low leakage rate of the vacuum chamber 11, 12 remaining under a vacuum when the other of the vacuum chambers 11, 12 is flooded. Furthermore, a process mode is provided by the control device 9. In this mode, vacuum processes can be performed through the use of a process gas in one of the vacuum chambers 11, 12 (or in both vacuum chambers 11, 12 with different process gases), wherein a carryover of process gases being used from one chamber into the other is at least largely avoided. For this purpose, a lower pressing force acting on the seal 4 can be set.

A very large percentage of closing processes of the vacuum valve is typically performed in the course of processes carried out with the system, for example, a semiconductor processing system, wherein the service life of the elastic seal 4 can be increased by the lower pressing force set in the process mode, very especially when aggressive process gases are used.

For example, the pressing force acting on the seal 4 in the service mode can equal more than 2 N per mm seal length, e.g., 3 N per mm seal length. In the process mode, the pressing force acting on the seal 4 can lie, for example, in the range between 0.1-1 N per mm seal length, e.g., at approximately 0.3 N per mm seal length.

As another operating mode, for example, a transport mode could be provided in which the vacuum valve is transported. Here, a locking system can be activated for the closing member in the closed position.

A present configuration of the vacuum valve could be input by the user through an input into the input device 15, wherein at least two input options or selection options for different configurations are provided. The configuration could concern, for example, the construction of the elastic seal 4 that is used with respect to its material and/or with respect to its geometry. Thus, a selection between elastic seals consisting of FKM (fluoroelastomer, Viton), FFKM (perfluoroelastomer) or silicone could be made possible, wherein the set sealing force depends on the respective material of the seal. For example, in the case of a seal consisting of an FFKM or silicone, a lower pressing force could be set than in the case of a seal 4 consisting of FKM. The set pressing force could also be made dependent on the geometry of the seal that is used. The configuration as a function of which the pressing force is set could instead or also concern the construction of the closing member 3 that is used. Here, a selection between different closing members 3 could be made possible that differ with respect to their geometry and/or with respect to the geometry and/or the material of the elastic seal 4 arranged (fixed) or exchangeable on the members.

Furthermore, a user input into the input device 15 of the control device 9 could be allowed with which the type (i.e., chemical composition) of at least one process gas is selected with which the elastic seal 4 comes into contact, wherein the pressing force acting on the elastic seal in the closed state of the closing member 3 is set as a function of the type of process gas. For different process gases, for example, different leakage rates could be specified. Therefore, the service life of the elastic seal 4 could be increased. The pressing force acting on the elastic seal 4 in the closed state could also be varied as a function of the pressure of the process gas.

Furthermore, an input of a parameter through use of the input device 15 of the control device 9 could also be allowed that reflects the number of particles formed in the closing process of the vacuum valve. As a function of this parameter, (among other things) the pressing force exerted on the seal 4 could be set, because the particle generation also depends on the strength of the pressure of the seal 4. Here, for processes that are sensitive with respect to generated particles, a higher leakage rate of the vacuum valve could also be taken into account in the closed state. The closing velocity with which the seal 4 contacts the seal face 35 could also be varied as a function of the permitted particle generation.

Instead of a user input of a parameter as a function of which the pressing force acting on the elastic seal 4 is set, such a parameter could also be detected automatically by the control device 9. Such a detection can be performed by a suitable sensor. Thus, for example, the elastic seal 4 that is used could have corresponding coding that contains information of its construction, for example, the material from which it consists. This coding could be detected by a sensor and fed to the control device 9 as an input signal.

Figure 3:
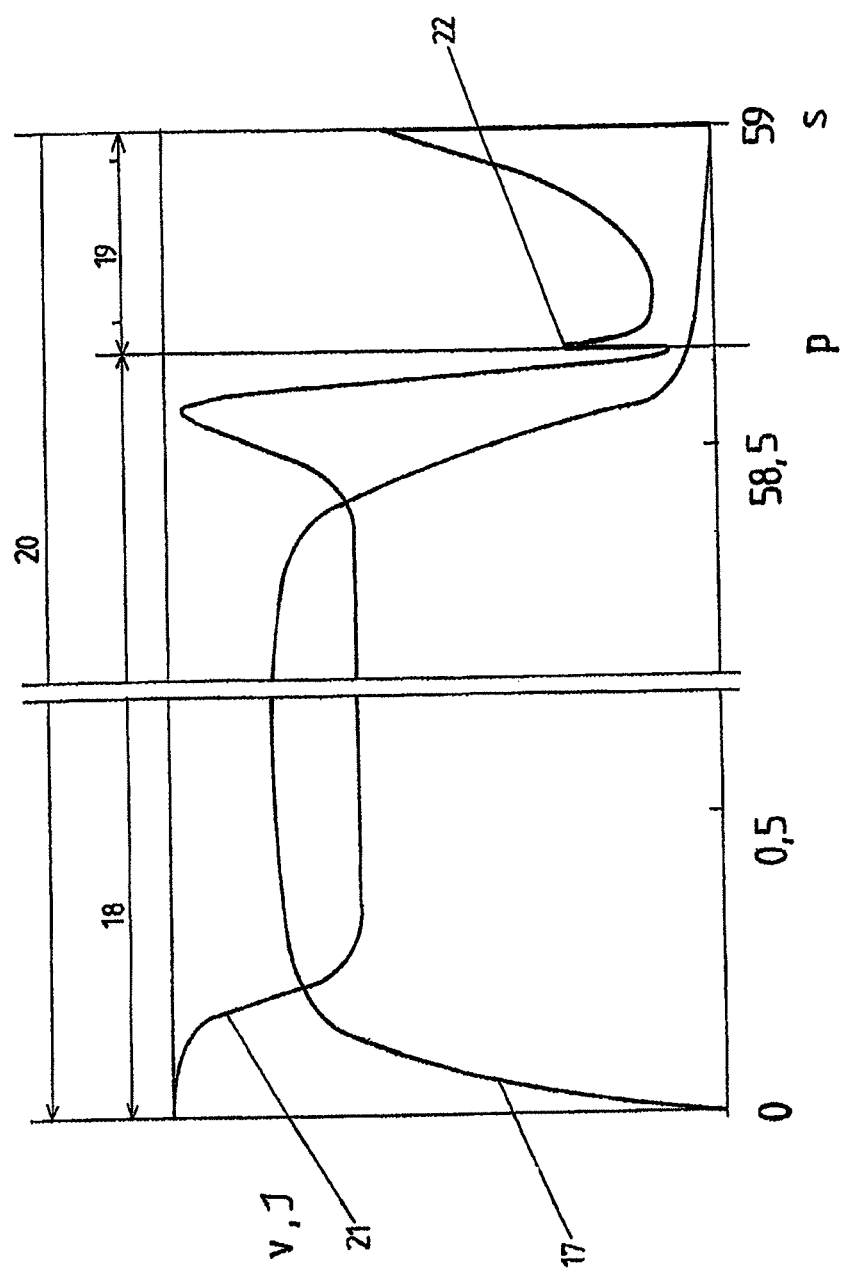
FIG. 3 is a diagram of the velocity of the closing member and the current intensity of the actuator as a function of the path of the closing member.

In FIG. 3, a diagram is shown in which the velocity v of the closing member 3 as a function of the closing path s is shown as the curve 17. At the beginning of the closing path s, the velocity v initially increases to a value that is essentially maintained across a large part of the closing path. Before the end of the closing path, the velocity v decreases, in turn, until at the end of the closing path at which the elastic seal 4 is pressed with the desired force onto the seal face, the stoppage of the closing member 3 is achieved.

The point at which the elastic seal 4 is set on the seal face is drawn in FIG. 3. The closing path up to this point p could also be designated as the closing stroke 18 and the closing path from this point p up to the setting could be designated as the sealing stroke 19. The entire closing path could also be designated as the total stroke 20.

In the illustrated embodiment, the total closing path s is specified, as an example, with 59 mm.

The velocity v of the closing member 3 with which this member approaches the contact point p can be set by the control device 9. The magnitude of this velocity v at the contact point p (=contact velocity) can here be set as a function of at least one input parameter for the control or regulation, for example, as a function of the material from which the elastic seal 4 is made. In particular, elastic seals made from FKM (Viton), FFKM, or silicone are known. For example, for a seal made from an FFKM material, a lower contact velocity could be selected than for a seal consisting of FKM or silicone.

Figure 6A:
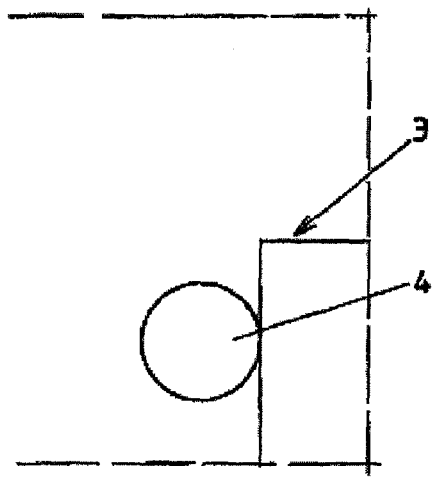
FIG. 6a is a schematic diagram of a closing member with a changeable elastic seal.
Figure 6B:
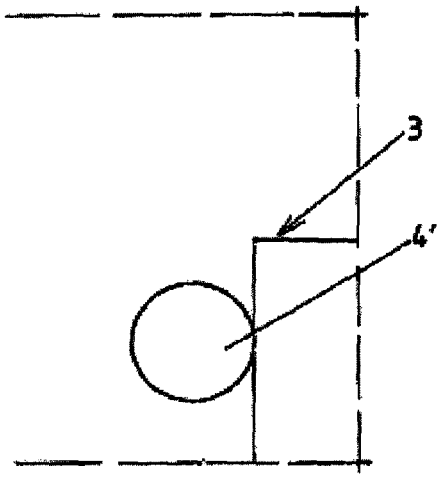
FIG. 6b is a schematic diagram of another embodiment of a closing member with an alternative elastic seal.

FIGS. 6a and 6b schematically show a part of the closing member 3 with a changeable elastic seal 4. The elastic seal 4 can consist of FKM and a seal 4' can consist of FFKM. If the seal 4' is used, the pressing force acting on the seal 4' is set to a lower value in the closed position of the closing member 3 as compared to the pressing force when the seal 4 is inserted in the closing member 3.

Figure 7A:
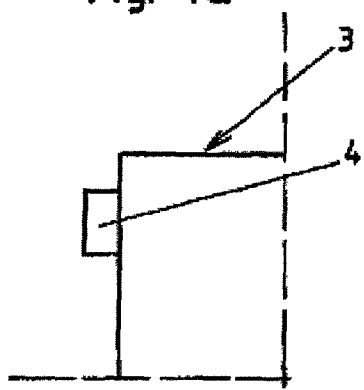
FIG. 7a is a schematic diagram of a closing member with an elastic seal fixedly arranged.
Figure 7B:
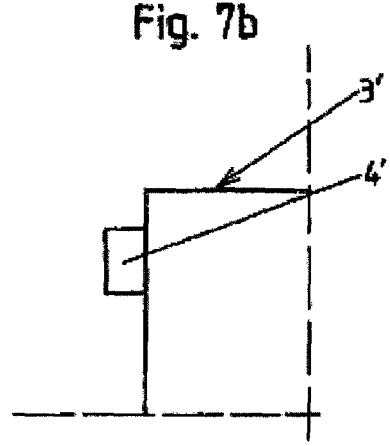
FIG. 7b is a schematic diagram of another embodiment of a closing member with an elastic seal fixedly arranged.

FIGS. 7a and 7b schematically show closing members 3, 3' which have elastic seals 4, 4' fixedly arranged on them. The seal 4 of closing member 3 can consist of FKM and the seal 4' of closing member 3' can consist of FFKM. Depending on which closing member 3, 3' is built into the valve, the pressing force acting on the elastic seal in the closed state of the vacuum valve is set to different values.

In FIG. 3, the magnitude of the current I consumed by the actuator versus the closing path s is also shown as the curve 21. After the initial acceleration of the actuator 5, the current I decreases to a value that is essentially constant across a large part of the closing path (advantageously, the variation equals less than 10%). For braking the closing member 3 shortly before reaching the contact point p, the supplied current intensity initially increases, in order to subsequently decrease, in turn. With the contact of the seal 4 on the seal face, at the contact point p there is also a peak 22 (=an increase and a decrease of the current intensity across a relatively short interval) of the current intensity. Subsequent to this peak, the current intensity I increases with increasing pressure of the elastic seal 4 at the end of the sealing path. In the closed position, the current supply can be switched off after activation of the holding device 36.

Preferably, at least 20%, advantageously at least 40%, of the time required for the total closing path s is dedicated to the last section of the closing path s that extends across twice the sealing stroke 19.

From the peak 22 of the current intensity, the contact point p could be detected by the control device 9.

If the detection of the current value of the contact point p is performed again, then, e.g., the wear of the seal can be determined from the position of the contact point p. Due to wear and incomplete restoration to the original shape after repeated compression, the contact point p shifts increasingly far away from the starting point of the closing path or another fixed point with respect to the valve body 1 that is crossed when closing the vacuum valve. If the comparison of the detected current value of the contact point with a specified limiting value produces wear that is too great on the elastic seal 4, then a service signal that indicates the requirement for exchanging the elastic seal 4 is output by the control device 9.

The pressing force exerted on the elastic seal 4 in the closed position of the closing member 3 could also be adapted, for example, as a function of the detected position of the contact point p. Thus, this pressing force could be increased in the case of higher wear, in order to still achieve a desired gas tightness (leakage rate).

Instead of the force control or regulation described above, the pressing force acting on the elastic sealing force can also be performed through path control or regulation (=location or position control or regulation). For example, for this purpose, the contact point p of the elastic seal 4 on the seal face 35 can be detected as described and the closing member 3 can then be moved to this contact point p by a desired path farther in the direction toward the seal face 35 (i.e., a desired sealing stroke is performed).

During closing, when the specified closed position is reached, the holding device (brake) 36 is activated, in order to fix the set pressing force. Then the supply of the operating means, in the present case, the supply of current, can be switched off.

In the case of an elimination of the operating means, through a self-closing construction of the holding device 36, a determination of the closing member 3 at the position at which it is currently located can be performed, which represents a safety feature.

The pressing force acting on the elastic seal 4 in the closed position of the closing member 3 can be set by the control device 9 also as a function of the differential pressure acting between the two vacuum chambers 11, 12, as this is known.

Figure 4:
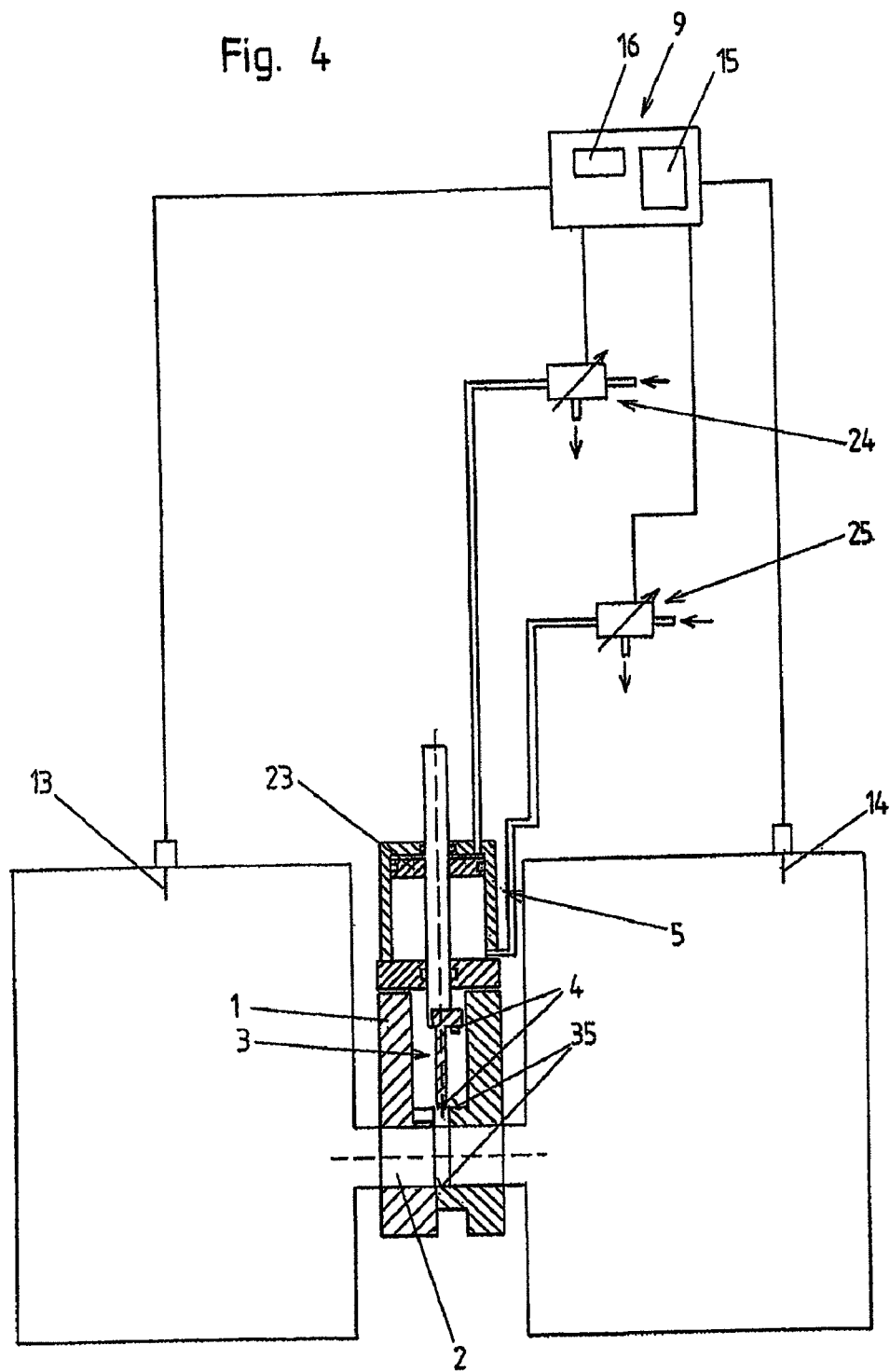
FIG. 4 is a schematic diagram of another embodiment of a vacuum valve that is arranged between two vacuum chambers and that can be controlled or regulated in a way according to the invention.

One embodiment for a pneumatically operated vacuum valve is shown schematically in FIG. 4. Here, compressed air is fed as the operating means to the actuator 5. The closing force exerted by the piston-cylinder unit can be set by the control elements 24, 25. Furthermore, in order to be able to perform an effective regulation of the velocity of the closing member 3, it could be provided to simultaneously load the piston 23 of the actuator 5 on both sides with compressed air, wherein the pressure difference in the two cylinder chambers can be set by the control device 9 by corresponding control elements 24, 25.

The contact point p of the elastic seal 4 on the seal face 35 could be optionally detected here from the pressure profile across the closing path s.

Independent of the type of actuator 5 that is used, the contact point p could also be detected, for example, optically by a camera.

In this embodiment, the control or regulation of the vacuum valve could be performed in a way analogous to before with reference to FIGS. 1 to 3, wherein the control or regulation of the closing member 3 is realized, instead of as before by the current intensity, now by the pressure or the pressure difference of the operating means.

Figure 5:
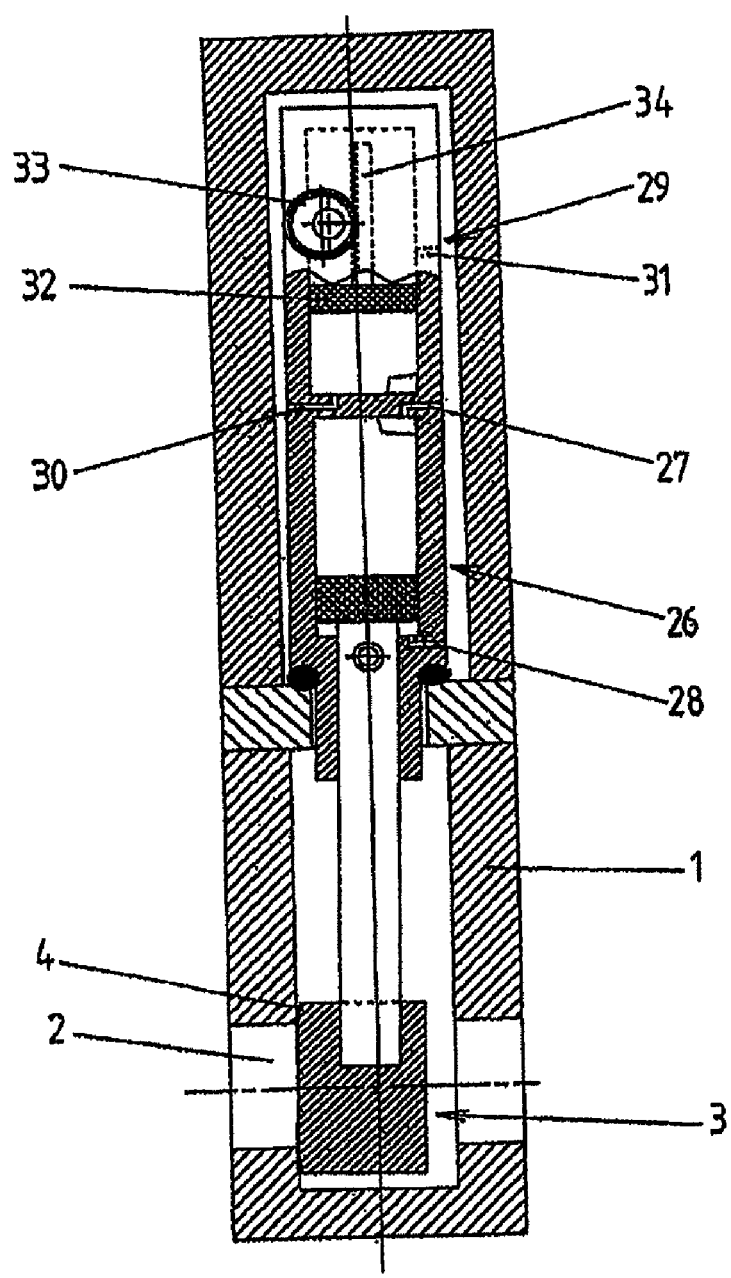
FIG. 5 is a schematic section diagram of another embodiment of a vacuum valve that can be controlled or regulated in a way according to the invention.

The different described aspects of the invention can also be realized for vacuum valves with different constructions. In FIG. 5, an L-valve is shown merely as an example. Through the use of the actuator 26 constructed as a piston-cylinder unit, the closing member 3 is set between its open position and a position that is opposite the seal face but that is still raised from the seal face, for the purpose of charging and bleeding the compressed air lines 27, 28 corresponding to the compressed air. Through use of the actuator 29 that is likewise formed by a piston-cylinder unit, the closing member 3 is pressed onto the valve seat having the seal face, for the purpose of charging or bleeding the compressed air lines 30, 31 corresponding to the compressed air, in order to move the piston 32. The pressing of the seal 4 on the seal face arranged on the valve body 1 is performed through the gear wheel 33 that is positioned eccentrically and that interacts with the toothed rack 34 arranged on the piston 32. By setting the pressure of the compressed air fed through the compressed air line 30, the closing force exerted by the actuator 29 can be set by the control device 9. Here, the differential pressure existing between the two sides of the closing member 3 can be taken into account, in order to set a desired value for the pressing force exerted on the elastic seal 4. The setting of the pressing force 4 can here be realized, in turn, as a function of at least one parameter, as has been explained in detail in connection with the embodiment shown in FIGS. 1 to 3.

Instead of an actuator whose closing force can be set, for the different types of vacuum valves in which the method according to the invention can be performed, actuators can also be used with which the closing position can be set, as has already been explained as an example in connection with FIGS. 1 and 2. Here, if the closed position is regulated (with a return of the actual value of the closed position), then the pressing of the seal is given directly from the set closed position and is (for all types of vacuum valves) essentially independent of the differential pressure between the two sides of the closing member 3.

For example, the full pressing of the elastic seal 4 in the closed state of the closing member 3, that is, the closing stroke, can lie in the range from 5 to 10% of the diameter of the seal. In the case of a diameter of the elastic seal of, e.g., 5.3 mm, a typical value for the full pressing lies in the range of 0.3 mm. This full pressing is performed in the service mode of the seal. In the process mode, the pressing favorably equals less than 30%, advantageously less than 10% of the full pressing.

These values for the closing stroke also apply preferably in the case of force control or regulation.

In all of the embodiments, by monitoring the force required for adjusting the closing member 3, clamping protection relative to foreign bodies can be provided. In particular, in the case of detection of the contact point p, it can be monitored whether, during closing, a force increase exceeding a specified limiting value occurs before reaching the contact point p, in order to realize such clamping protection.

For detecting the location and/or the velocity of the closing member 3, different types of sensors could be used, for example, optical or inductive sensors.

Fixing the closing member 3 in its closed position could also be achieved, for example, through a self-blocking construction of the movement of the actuator 5 of transferring gear elements (for example, self-blocking spindle-type lifting gear) or the actuator itself or in that gear elements are moved across a dead center point.

LEGEND TO THE REFERENCE NUMBERS

1 Valve body
2 Valve opening
3 Closing member
4 Elastic seal
5 Actuator
6 Pinion
7 Toothed rack
8 Seal
9 Control device
10 Sensor
11 Vacuum chamber
12 Vacuum chamber
13 Pressure sensor
14 Pressure sensor
15 Input device
16 Output device
17 Curve
18 Closing stroke
19 Sealing stroke
20 Total stroke
21 Curve
22 Peak
23 Piston
24 Control element
25 Control element
26 Actuator
27 Compressed air line
28 Compressed air line
29 Actuator
30 Compressed air line
31 Compressed air line
32 Piston
33 Gear wheel
34 Toothed rack
35 Seal face
36 Holding device
37 Friction element

The invention claimed is:

1. Method for controlling or regulating a vacuum valve, comprising:
providing a valve body with a valve opening, a closing member that can be moved between an open position and a closed position for closing the vacuum valve and that closes the valve opening in the closed position, wherein in the closed position at least one elastic seal is pressed with a pressing force onto a seal face and in the open position the seal is spaced apart from the seal face, an actuator for moving the closing member, and a control device by which the actuator is triggered and by which the pressing force acting on the elastic seal in the closed position of the closing member is set,
wherein the pressing force acting on the elastic seal in the closed position of the closing member is set by the control device as a function of at least one parameter that represents one of at least two possible configurations of the closed vacuum valve.

2. Method for controlling or regulating a vacuum valve, comprising:
providing a valve body with a valve opening, a closing member that can be moved between an open position and a closed position for closing the vacuum valve and that closes the valve opening in the closed position, wherein at least one elastic seal is pressed with a pressing force onto a seal face, an actuator for moving the closing member, and a control device by which the actuator is triggered and by which the pressing force acting on the elastic seal in the closed position of the closing member is set,
setting the pressing force acting on the elastic seal as a function of at least one parameter that represents one of at least two possible configurations of the vacuum valve,
wherein the pressing force acting on the elastic seal is set as a function of a construction of the elastic seal or the closing member, wherein at least two different constructions of at least one of the elastic seals or closing members are used.

3. Method according to claim 2, wherein an input can be performed by the user for selecting between the two or more different constructions of at least one of the elastic seal or the closing member, with the setting of the pressing force acting on the elastic seal being performed as a function of this input.

4. Method for controlling or regulating a vacuum valve, comprising:
providing a valve body with a valve opening, a closing member that can be moved between an open position and a closed position for closing the vacuum valve and that closes the valve opening in the closed position, wherein at least one elastic seal is pressed with a pressing force onto a seal face, an actuator for moving the closing member, and a control device by which the actuator is triggered and by which the pressing force acting on the elastic seal in the closed position of the closing member is set, and
setting of the pressing force acting on the elastic seal as a function of a type of at least one process gas coming in contact with the elastic seal wherein depending on the type of the at least one process gas the pressing force is set to different values.

5. Method according to claim 4, wherein the type of process gas can be input by the user.

* * * * *